May 1, 1923.

J. W. FAY

WELDED JOINT

Filed Dec. 19, 1921

1,453,343

WITNESSES

M. E. Downey

C. L. Neal

Joseph W. Fay
INVENTOR

Louis Juan
ATTORNEY

Patented May 1, 1923.

1,453,343

UNITED STATES PATENT OFFICE.

JOSEPH W. FAY, OF MILWAUKEE, WISCONSIN, ASSIGNOR TO FRED PABST COMPANY, A CORPORATION OF WISCONSIN.

WELDED JOINT.

Application filed December 19, 1921. Serial No. 523,559.

*To all whom it may concern:*

Be it known that I, JOSEPH W. FAY, a citizen of the United States, residing at Milwaukee, in the county of Milwaukee and State of Wisconsin, have invented certain new and useful Improvements in Welded Joints, of which the following is a specification.

The invention relates to an electrically welded joint and method of making the same.

This invention is designed to provide a reenforced joint between two plates or other members which are welded together by a reenforcing strip of fusible material to which the plates or other members are welded to form a joint, such strip including a tongue portion and flanged portions serving to reenforce the joint against strains transversely of and along the joint, and the invention further consists in welding the strip to the members by drawing the arc between the fusible metallic electrode and the tongue portion of the strip, such method enabling the operator to turn out a large amount of work in a relatively short time.

The invention further consists in the several features hereinafter set forth and more particularly defined by claims at the conclusion hereof.

Figure 1:
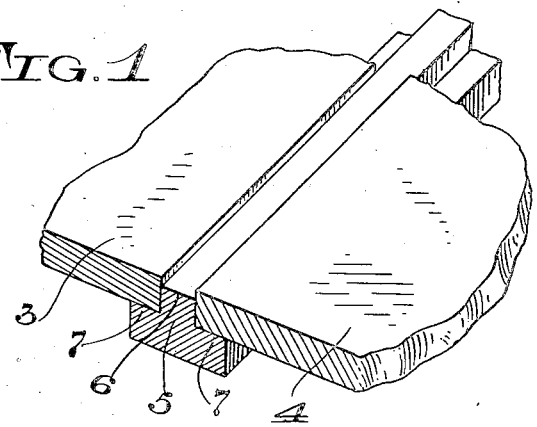
Figure 2:
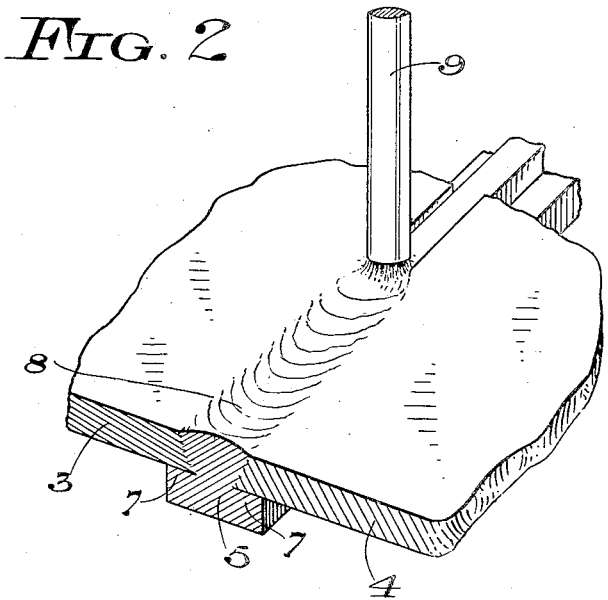

In the drawings: Fig. 1 is a perspective view of a joint embodying the invention, with the parts in position before welding; Fig. 2 is a perspective view showing the joint in the process of welding.

In the drawings the numerals 3 and 4 designate the plates or other members to be welded together, and 5 a reenforcing strip, capable of being fused by the arc, to which the edges of the plates 3 and 4 are welded by forming a weld between said strip and each of the adjoining edges of the plates 3 and 4 as clearly shown in Fig. 2.

This reenforcing strip is preferably of a T-shaped section providing a tongue 6 and shoulders 7, the edges of the members to be welded abutting against the sides of the tongue and one of the sides of said members adjacent the edge abutting one of the shoulders 7. It will be noted that this permits the strip to act as a temporary gauge for the plates which, of course, must be held by other means in a fixed position during the welding operation. The tongue may be of a height to extend to a point below, flush with, or slightly above the surface of the plates or other members to be welded. The drawing shows the tongue extending slightly below the upper surface of the plates, and the welding material 8 is deposited over the top of the tongue and the upper surfaces of the plates at the joint and fuses with said strip and the edges of the plates to form the integrally welded joint. I have found that by drawing the arc between the fusible metallic electrode 9 and the upper portion of the tongue of the strip and the plates adjacent thereto that the heat of the arc will readily penetrate the strip and the adjacent edges of the plate so that a quick and efficient weld can be made. The reenforcing strip being of greater depth than the thickness of the plates obviously reenforces the joint against lengthwise strains, and the flanged extensions forming the shoulders 7 also reenforce the joint against transverse strains.

The reenforcing strip may be of any length required, and also the tongue portion which fits between the parts to be welded can be of any height or thickness desired. By drawing the arc between the electrode and the tongue portion of the strip a good weld is assured, as the tongue portion does not interfere with the proper transfer of metal directly to the joint between it and the plates.

What I claim as my invention is:

The herein described method of joining sheet metal parts which comprises positioning the edges of the sheet metal upon the face of a backing bar having relatively low spacing projections, directing an arc against the face of the bar between the projections to fuse the edges of the sheet metal and the projections, to unite the sheet metal to the backing bar and to fill the groove between the edges of the sheet metal with additional metal.

JOSEPH W. FAY.